(No Model.)
W. W. CROCKETT.
CUTTER AND HOLDER FOR FRUIT, FLOWERS, &c.
No. 605,400. Patented June 7, 1898.
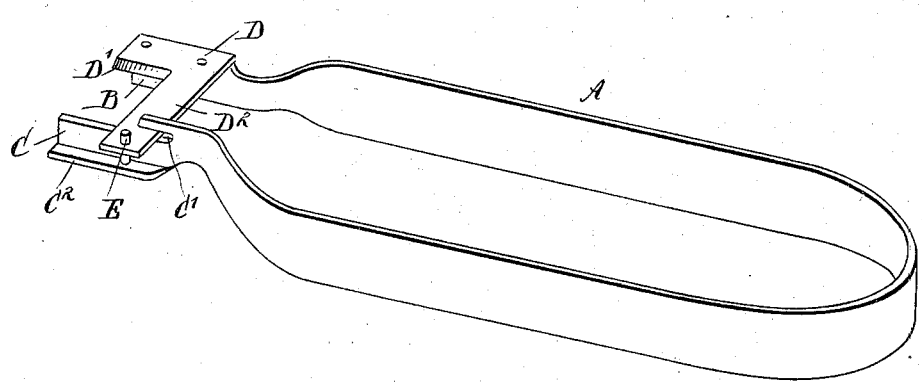
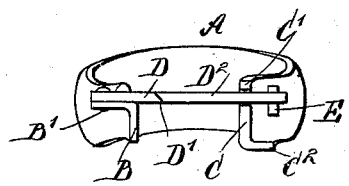
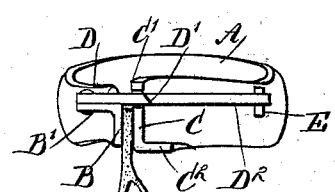
WITNESSES:
INVENTOR
BY
ATTORNEYS.

United States Patent Office.

WILLIAM W. CROCKETT, OF FALLS CITY, NEBRASKA.

CUTTER AND HOLDER FOR FRUIT, FLOWERS, &c.

SPECIFICATION forming part of Letters Patent No. 605,400, dated June 7, 1898.

Application filed October 23, 1897. Serial No. 656,203. (No model.)

*To all whom it may concern:*

Be it known that I, WILLIAM W. CROCKETT, of Falls City, in the county of Richardson and State of Nebraska, have invented a certain new and useful Improvement in Cutters and Holders for Fruit, Flowers, &c., of which the following is a full, clear, and exact description.

The invention relates to shears; and its object is to provide a new and improved cutter and holder designed for cutting off fruit, vegetables, flowers, &c., and for trimming shrubbery and the like, the device being arranged to securely and conveniently hold the cut-off article for safely landing the same in a basket or other receptacle.

The invention consists principally of a pair of jaws adapted to be moved toward and from each other and a cutter on one of the jaws and having its edge operating in conjunction with the top edge of the other jaw to cut the stem of the fruit, flower, or like article previous to clamping the same upon further closing the jaws.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a perspective view of the improvement. Fig. 2 is a front edge view of the same with the jaws open, and Fig. 3 is a similar view of the same with the jaws closed and the stem cut off.

The improved tool is provided with a handle A, preferably made of spring-steel and bent into U form, with the free ends of the handle formed into jaws B and C, adapted to close upon pressing the members of the handle A and to open upon releasing the pressure on the handles, as will be readily understood by reference to the drawings.

The jaw B is formed on its upper end with an outwardly-bent flange B', on which is riveted or otherwise secured a horizontally-disposed cutter D, extending toward the other jaw C and having its cutting edge D' in advance of the jaw B and above the top edge thereof, as is plainly indicated in Figs. 2 and 3.

The cutter D is provided with an arm $D^2$, projecting at angles to the cutting edge D' and extending loosely into a slot C', formed on the other jaw C, the said slot being a guideway for the said arm to guide the opening and closing of the jaws upon pressing and releasing the members of the handle A.

In the outer end of the arm $D^2$ is secured a pin E for limiting the opening and closing of the jaws, the said pin abutting against the outer side of the jaw C when the members of the handle A are open.

Now it will be seen that the arm D not only forms a guide for the jaws and cutter, but it also forms a stop for the stem to be cut off and passed between the jaws, so that upon applying the tool when the jaws are open it is only necessary to pass the open jaws upon the stem until the stem abuts against the arm $D^2$ and the operator upon pressing the members of the handle A closes the jaws, and in doing so the top edge of the jaw C operates, in conjunction with the cutting edge D' of the cutter, so as to cut the stem and clamp the stem portion below the cutting edge between the jaws B and C upon further pressure of the members of the handle A.

The lower end of the jaw C is formed with an outwardly-bent flange $C^2$ for strengthening the said jaw and for conveniently releasing the stem without bruising the same upon allowing the jaws to open. This is effected by rolling or turning the tool slightly, so that the rounded edge between the parts C and $C^2$ (see Fig. 2) engages the stem of the plant and pushes the stem sidewise.

Thus it is evident that the device can be readily used for cutting off grapes, fruits, vegetables, and the like, at the same time supporting the cut-off article to permit of safely landing it in a basket or other receptacle. Furthermore, the device can be used for trimming shrubbery the same as ordinary shears.

Having thus fully described my invention, I claim as new and desire to secure by Letters Patent—

1. A cutting apparatus, having a handle composed of two members mounted to move toward and from each other, each member terminating in a flat jaw, arranged with their faces in parallel planes, the jaws being capable of grasping between them the stem of a plant, and one of the jaws having at its upper edge an outwardly-bent flange, and the other of the jaws having at its lower edge an outwardly-bent flange and at its upper edge a slot extending horizontally therein, and a cutter proper or blade secured rigidly on the outwardly-bent flange at the upper edge of the first-named jaw, said cutter or blade extending horizontally toward the other jaw and having an arm normally projecting over the said other jaw and through the slot in the upper edge thereof, the free end of said arm carrying a pin to limit the movement of the jaws away from each other.

2. A cutting apparatus, having a handle formed of two members movable toward and from each other, each member terminating at its free end in a jaw and the jaws having flat faces in parallel planes, between which faces the stems of plants may be engaged and held, one of the jaws having in its upper edge a horizontally-extending slot, and a cutter proper or blade secured to the other jaw and horizontally disposed so as to engage the upper edge of the jaw with the slot, the cutter or blade having a horizontally-projecting arm extending over the upper edge of the jaw with the slot and through the slot, the end of the arm having a pin to limit the movement of the jaws away from each other.

WILLIAM W. CROCKETT.

Witnesses:
P. M. HALSEY,
M. S. MESSLER.